(No Model.)
F. E. HARTZELL.
HOSE REEL.
No. 574,419. Patented Jan. 5, 1897.
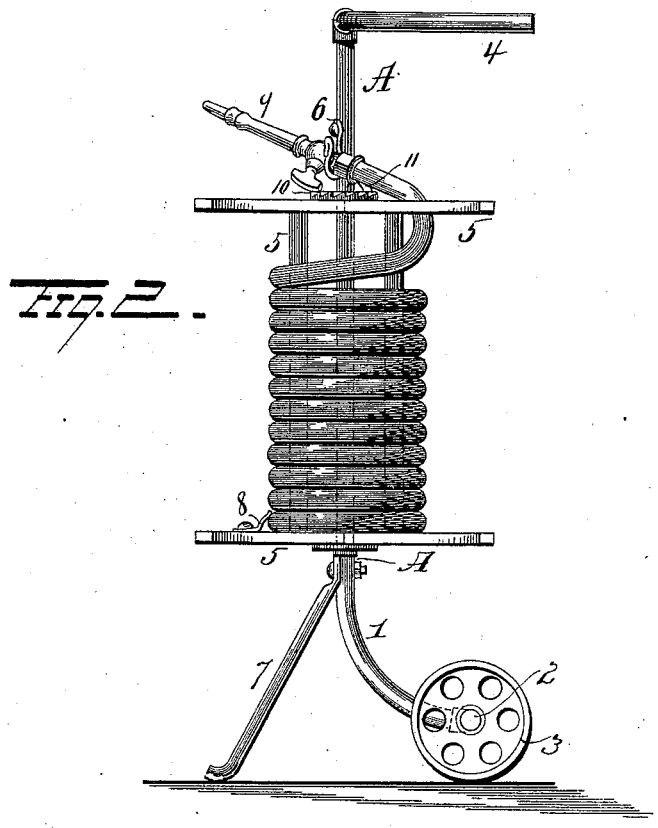
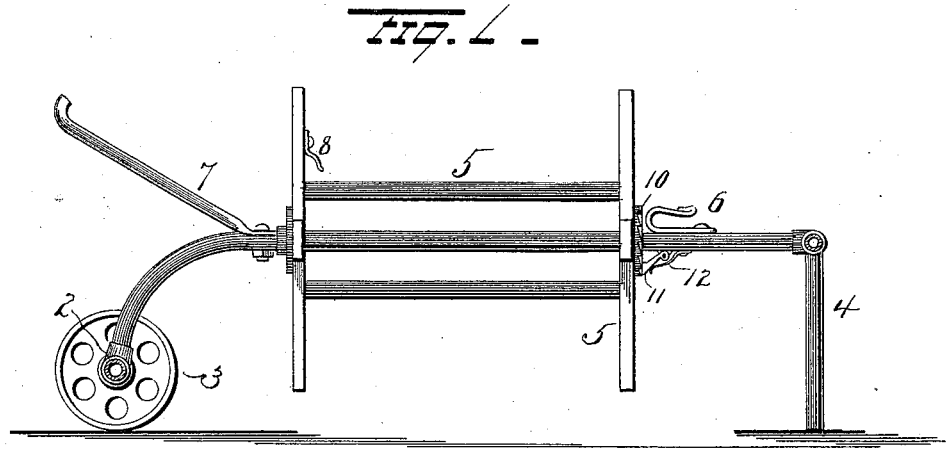

UNITED STATES PATENT OFFICE.

FRANK E. HARTZELL, OF ALLIANCE, OHIO.

HOSE-REEL.

SPECIFICATION forming part of Letters Patent No. 574,419, dated January 5, 1897.

Application filed April 13, 1896. Serial No. 587,316. (No model.)

*To all whom it may concern:*

Be it known that I, FRANK E. HARTZELL, a resident of Alliance, in the county of Stark and State of Ohio, have invented certain new and useful Improvements in Hose Reels and Trucks; and I do hereby declare the following to be a full, clear, and exact description of the invention, such as will enable others skilled in the art to which it appertains to make and use the same.

My invention relates to an improved hose reel and truck, the object of the invention being to construct a device of the class mentioned by means of which the reel can be disposed in a vertical position, whereby to facilitate the complete drainage of the hose.

A further object is to produce a combined garden-hose reel and truck which shall be cheap to construct, which shall be light in weight, but strong and substantial, which shall be neat in appearance, convenient to use, and which shall be compact, and also effectual in all respects in the performance of its functions.

With these objects in view the invention consists in certain novel features of construction and combinations and arrangements of parts, as hereinafter set forth, and pointed out in the claims.

In the accompanying drawings, Figure 1 is a view showing my improved reel and truck disposed in a horizontal position. Fig. 2 is a view showing the device disposed in a vertical position.

The entire device, with the exception of the reel and the wheels, I prefer to make of pipe.

A represents a standard or body portion of pipe which is bent or curved at one end, as at 1. To the free end of the portion 1 of the tubular rod or standard A a cross-bar or axle or piping 2 is secured at a point centrally between its ends, and on the ends of said cross-bar or axle wheels 3 3 are mounted. To the other end of the tubular rod or standard A a cross-bar 4 of piping is secured centrally between its ends, said bar 4 being U-shaped or angular in form and serving as handles for the truck and also as legs for supporting one end of the truck when the latter is disposed in a horizontal position. Between the ends of the tubular rod or standard A a reel 5 (preferably of wood) is revolubly mounted and adapted for the reception of hose, a hook or catch 8 being secured to the lower end of the reel to receive the lower end of the hose and hold it in position. When the hose is wound on the reel, the nozzle 9 of said hose can be held in proper position to permit the escape of water therefrom for the purpose of watering a lawn or for other purpose by means of a hook or catch 6, attached to the rod or standard A.

In order to permit the hose to be properly coiled on the reel and to prevent it from unwinding further than may be desired, a ratchet device will be applied at one end of the reel. This device may conveniently consist of a ratchet-wheel 10, secured to one end of the reel, and a dog 11, attached to the standard and pressed into engagement with the ratchet-wheel by means of a spring 12.

If desired, the device can be made to assume a vertical position, as shown in Fig. 2, and for this purpose a leg or brace 7 of piping will be secured to the rod or standard A at or near the curved or bent position thereof, so that when the device is made to stand vertically it will be supported on said leg or brace 7 and the wheels 3. When the device is thus disposed with the hose wound thereon, the convolutions of said hose will lie one upon the other in a slightly-inclined position, and thus the thorough draining of the hose will be greatly facilitated.

Whether the device be disposed in a horizontal or a vertical position the weight of the reel and the hose will in either case be directly upon the tubular rod or standard A.

My improvements are simple in construction, comprise few parts, are cheap to manufacture, are ornamental in appearance, light and durable in construction, and effectual in all respects in the performance of their functions.

Slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. The combination with a frame or body composed of a single rod curved at its lower end, an axle rigidly secured to said curved end, and a leg or brace secured to the rod at a point above the curved portion thereof, of a hose-reel loosely mounted on said rod, substantially as set forth.

2. The combination with a frame or body composed of a single rod curved at its lower end, an axle secured to the lower end and a leg or support secured to the upper or free end of said rod, of a reel mounted on the rod and adapted to turn thereon.

3. The combination with a truck comprising a rod, an axle secured to one end of the rod, a leg or support at the other end, and wheels on the axle, of a reel mounted on the rod and adapted to turn thereon and a ratchet device between said reel and rod, substantially as set forth.

4. The combination with a rod, of supports at the respective ends of said rod, a reel revolubly mounted on said rod between its ends and a device for attaching a hose-nozzle to said rod, substantially as set forth.

5. The combination with a rod having a bent end, of a cross-bar secured between its ends to said bent end of the rod, wheels at the ends of said cross-bar and a reel revolubly mounted on said rod between the ends thereof, substantially as set forth.

6. The combination with a tubular rod having a curved end, of a tubular cross-bar secured between its ends to said curved end of the tubular rod, wheels at the ends of said tubular cross-bar and a reel mounted on said tubular rod, substantially as set forth.

7. The combination with a rod or standard curved at one end, of a cross-bar or axle secured between its ends to the curved end of the rod or standard, wheels on the ends of said cross-bar, and a U-shaped bar at the other end of said rod or standard, said U-shaped bar serving as handles and also as supporting-legs for the truck, substantially as set forth.

8. The combination with a rod or standard having a curved end, of a cross-bar secured to said curved end of the rod or standard, wheels on the ends of said cross-bar, a reel mounted on said rod or standard, a U-shaped bar at the outer end of the rod or standard, and a leg or brace secured to the rod or standard at or near the curved portion thereof, substantially as set forth.

In testimony whereof I have signed this specification in the presence of two subscribing witnesses.

FRANK E. HARTZELL.

Witnesses:
  H. W. HARRIS,
  ALICE FORDING.